US010217174B2

United States Patent
Ghosh et al.

(10) Patent No.: US 10,217,174 B2
(45) Date of Patent: Feb. 26, 2019

(54) REAL-TIME WAIT ESTIMATION AND PREDICTION VIA EMBEDDED SENSORS

(71) Applicant: INTERNATIONAL BUSINESS MACHINES CORPORATION, Armonk, NY (US)

(72) Inventors: Rahul Ghosh, Morrisville, NC (US); William R. Lariccia, Durham, NC (US); Ravi K. Muthukrishnan, Bangalore (IN); Aaron J. Quirk, Durham, NC (US); Xian Jun Zhu, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 528 days.

(21) Appl. No.: 14/862,223

(22) Filed: Sep. 23, 2015

(65) Prior Publication Data

US 2017/0083991 A1    Mar. 23, 2017

(51) Int. Cl.
*G06Q 30/00* (2012.01)
*G06Q 50/12* (2012.01)
(Continued)

(52) U.S. Cl.
CPC .............. *G06Q 50/12* (2013.01); *G01G 19/52* (2013.01); *G01G 19/44* (2013.01)

(58) Field of Classification Search
CPC ......... G06Q 50/12; G01G 19/52; G01G 19/44
(Continued)

(56) References Cited

U.S. PATENT DOCUMENTS 5,006,983 A * 4/1991 Wayne .................... G06Q 10/06
                                                   340/286.06
5,243,155 A * 9/1993 Sirag, Jr. ................ B66B 1/2408
                                                   187/380
(Continued)

FOREIGN PATENT DOCUMENTS

| IN | 2681CHE2010 | 5/2011 |
| JP | 08249544 | 9/1996 |

OTHER PUBLICATIONS

QSR, "Restaurant Table Management Software, Guest Management", accessed via the internet at <http://www.gsrautomations.com/products/table-management/connectsmart-hostess.asp> as of Apr. 11, 2015, 2 pages.
(Continued)

*Primary Examiner* — Rokib Masud
(74) *Attorney, Agent, or Firm* — Richard Wilhelm; Amy J. Pattillo

(57) ABSTRACT

A management system receives inputs over a period of time from outputs of one or more sensors placed within a proximity to a service area, the one or more sensors for detecting at least one of at least one weight and at least one sound. The management system dynamically estimating, based on a rate of a percentage of change of the at least one weight over the period of time and types of sounds of the at least one sound for the service area, one or more wait times until a completion of use of the service area. The management system dynamically generating one or more wait time estimates in real time for a particular user requesting a particular service area size met by a current service area size of the service area based on the one or more wait times and a current number of other users waiting for the particular service area size.

19 Claims, 9 Drawing Sheets

(51) Int. Cl.
*G01G 19/52* (2006.01)
*G01G 19/44* (2006.01)

(58) Field of Classification Search
USPC .......................................... 705/5, 15, 14.73
See application file for complete search history.

(56) References Cited

U.S. PATENT DOCUMENTS

| | | | |
|---|---|---|---|
| 5,272,474 A | 12/1993 | Hilliard | |
| 6,714,643 B1 | 3/2004 | Gargeya et al. | |
| 6,810,343 B2 | 10/2004 | McKee | |
| 6,829,583 B1* | 12/2004 | Knapp | G06Q 10/02 705/15 |
| 6,845,361 B1 | 1/2005 | Dowling | |
| 7,077,751 B2* | 7/2006 | Nishiyama | A63F 13/08 463/1 |
| 7,215,759 B2 | 5/2007 | Brown et al. | |
| 7,756,745 B2* | 7/2010 | Leet | G06Q 10/02 705/15 |
| 7,778,937 B2 | 8/2010 | Ferrara et al. | |
| 8,104,585 B2* | 1/2012 | Smith | B66B 1/2458 187/247 |
| 8,260,320 B2* | 9/2012 | Herz | H04M 3/42348 455/456.1 |
| 8,299,930 B2 | 10/2012 | Schmid-Schonbein et al. | |
| 8,392,401 B1* | 3/2013 | Aly | H04L 67/2833 707/718 |
| 8,672,504 B2 | 3/2014 | Kramer | |
| 8,831,963 B2* | 9/2014 | Backer | G06Q 10/1095 705/5 |
| 2004/0158494 A1* | 8/2004 | Suthar | G06Q 30/06 705/15 |
| 2007/0117623 A1* | 5/2007 | Nelson | G06Q 30/02 463/29 |
| 2009/0055208 A1* | 2/2009 | Kaiser | G06Q 10/02 705/5 |
| 2010/0063854 A1 | 3/2010 | Purvis | |
| 2010/0317377 A1* | 12/2010 | Zou | G06Q 10/02 455/466 |
| 2011/0307547 A1 | 12/2011 | Backer | |
| 2013/0090959 A1 | 4/2013 | Kvamme | |
| 2013/0325526 A1 | 12/2013 | Tyler | |
| 2013/0332208 A1 | 12/2013 | Mehta | |
| 2014/0075014 A1* | 3/2014 | Chourey | G06Q 30/02 709/224 |
| 2014/0163934 A1 | 6/2014 | Zhang | |
| 2015/0035644 A1 | 2/2015 | June | |
| 2017/0011327 A1 | 1/2017 | Mantri et al. | |

OTHER PUBLICATIONS

"MyMenu wins the IBM Pulse App Throwdown", accessed via the internet at <https://www.ibm.com/developerworks/community/blogs/industry-solution-partners/entry/mymenu_wins_the_ibm_pulse_app_throwdown?lang=en> as of Aug. 28, 2015, 2 pages.

Ziosk Unveils New Tabletop Tablet Functionality at 2014 NRA show, dated May 14, 2014, accessed via the internet at <http://www.marketwatch.com/story/ziosk-unveils-new-tabletop-tablet-functionality-at-2014-nra-show-2014-05-14> as of May 13, 2015, 9 pages.

U.S. Appl. No. 14/862,253, filed Sep. 23, 2015, In Re Ghosh, 52 pages.

"List of IBM Patents or Patent Applications Treated as Related", dated Sep. 23, 2015, 2 pages.

USPTO Non-final Office Action, dated Apr. 6, 2018, U.S. Appl. No. 14/862,253, filed Sep. 23, 2015, In Re Ghosh, 35 pages.

USPTO Final Office Action, dated Nov. 2, 2018, U.S. Appl. No. 14/862,253, filed Sep. 23, 2015, In Re Ghosh, 20 pages.

Kimes et al., "Restaurant Revenue Management: Applying Yield Management to the Restaurant Industry," Cornell Hotel and Restaurant Admin Q, Jun. 1998, pp. 32-39, 8 pages.

Hwang et al., "The interaction of major resources and their influence on waiting times in a multi-stage restaurant," Intl. J. Hospitality Mgmt., vol. 27, 2008, pp. 541-51, 11 pages.

\* cited by examiner

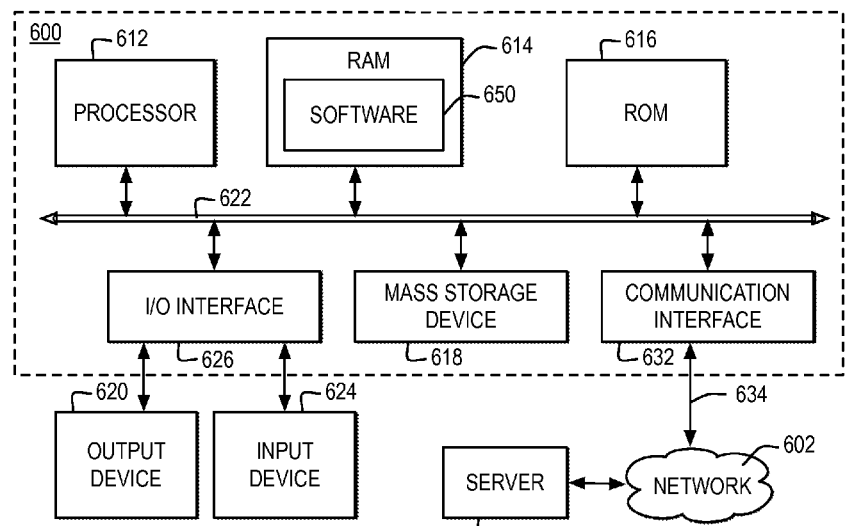
FIG. 6
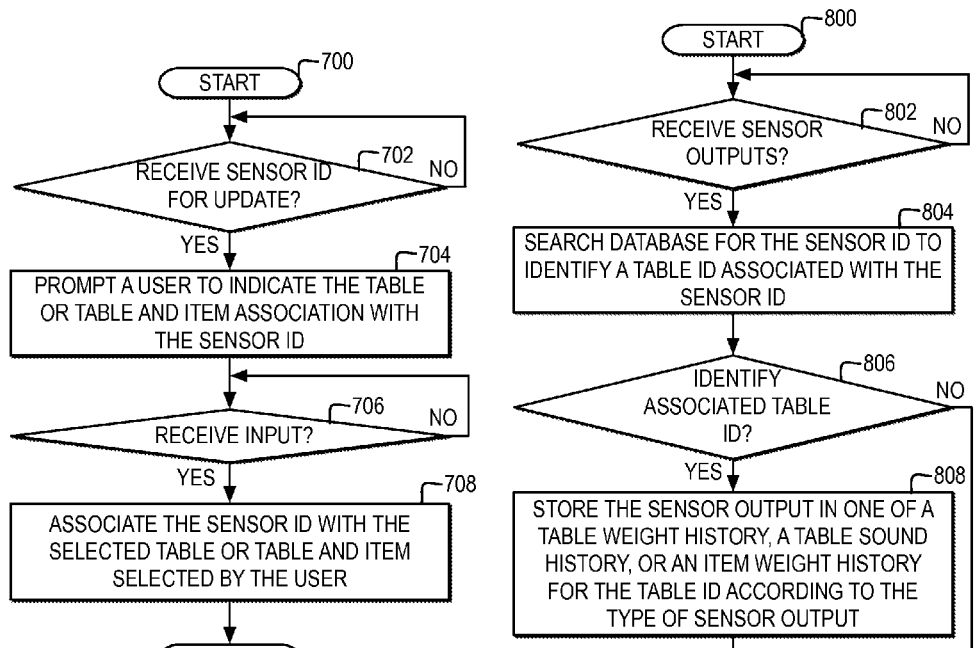
FIG. 7
FIG. 8 ial Field

REAL-TIME WAIT ESTIMATION AND PREDICTION VIA EMBEDDED SENSORS

BACKGROUND

1. Technical Field

The embodiment of the invention relates generally to sensors and particularly to real-time wait estimation and prediction via embedded sensors.

2. Description of the Related Art

There are many businesses and services that require potential customers to wait for service until current customers have completed use of a service area.

BRIEF SUMMARY

Therefore, in view of the foregoing, there is a need for a method, system, and computer program product for real-time wait time estimation and prediction to provide customers with accurate information about expected wait times for service.

In one embodiment, a method is directed to a computer system receiving, one or more inputs over a period of time from one or more outputs of one or more sensors placed within a proximity to a service area, the one or more sensors for detecting at least one of at least one weight and at least one sound. The method is directed to the computer system dynamically estimating, based on a rate of a percentage of change of the at least one weight over the period of time and one or more types of sound of the at least one sound for the service area, one or more wait times until a completion of use of the service area. The method is directed to the computer system dynamically generating one or more wait time estimates in real time for a particular user requesting a particular service area size met by a current service area size of the service area based on the one or more wait times and a current number of other users waiting in a queue for the particular service area size.

In another embodiment, a system comprises one or more processors, one or more computer-readable memories, one or more computer-readable storage devices, and program instructions, stored on at least one of the one or more storage devices for execution by at least one of the one or more processors via at least one of the one or more memories. The stored program instructions comprise program instructions to receive, one or more inputs over a period of time from one or more outputs of one or more sensors placed within a proximity to a service area, the one or more sensors for detecting at least one of at least one weight and at least one sound. The stored program instructions comprise program instructions to dynamically estimate, based on a rate of a percentage of change of the at least one weight over the period of time and one or more types of sound of the at least one sound for the service area, one or more wait times until a completion of use of the service area. The stored program instructions comprise program instructions to dynamically generate one or more wait time estimates in real time for a particular user requesting a particular service area size met by a current service area size of the service area based on the one or more wait times and a current number of other users waiting in a queue for the particular service area size.

In another embodiment, a computer program product comprises one or more computer-readable storage devices and program instructions, stored on at least one of the one or more storage devices. The stored program instructions comprise program instructions to receive, one or more inputs over a period of time from one or more outputs of one or more sensors placed within a proximity to a service area, the one or more sensors for detecting at least one of at least one weight and at least one sound. The stored program instructions comprise program instructions to dynamically estimate, based on a rate of a percentage of change of the at least one weight over the period of time and one or more types of sound of the at least one sound for the service area, one or more wait times until a completion of use of the service area. The stored program instructions comprise program instructions to dynamically generate one or more wait time estimates in real time for a particular user requesting a particular service area size met by a current service area size of the service area based on the one or more wait times and a current number of other users waiting in a queue for the particular service area size.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

FIG. 6 illustrates one example of a block diagram of a computer system in which one embodiment of the invention may be implemented;

FIG. 7 illustrates a high level logic flowchart of a process and computer program product for specifying sensors for tables and items in a restaurant;

FIG. 8 illustrates a high level logic flowchart of a process and computer program product for receiving and storing sensor outputs;

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
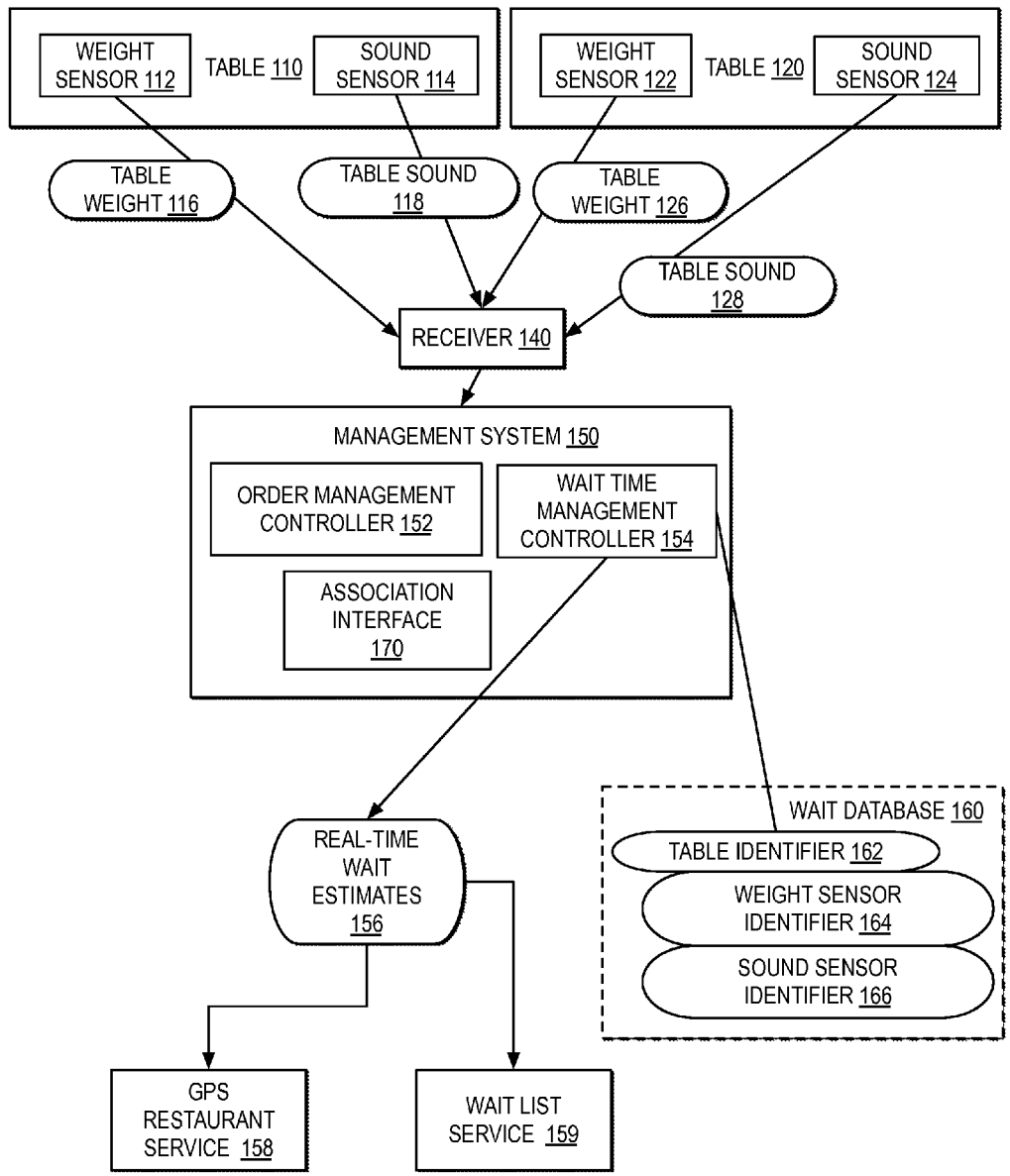
FIG. 1 illustrates one example of block diagram of a system for real-time wait time estimation and prediction via embedded service area sensors.

FIG. 1 illustrates a block diagram of one example of a system for real-time wait time estimation and prediction via embedded service area sensors.

In one example, one or more types of organizations may implement a management system 150 for managing real-time wait time estimation and prediction of service area availability within a space. For example, a wait time management controller 154 of management system 150 may perform real-time wait time estimation and prediction of service area availability for one or more service areas in a restaurant. In one example, service areas within a restaurant may include, but are not limited to, tables, bar areas, and other areas with a capacity. In another examples, one or more of management system 150 and wait time management controller 154 may be implemented by organizations other than a restaurant where there is a wait time for customers to access resources, services, or spaces provided by the organization.

In addition, one or more restaurant management functions may be integrated within or accessible to management system 150. For example, management system 150 may also manage an order management controller 152 that manages one or more of the functions for one or more interfaces through which orders are placed by service area, including, but not limited to, outputting order information to a meal preparation area, tracking when items for an order are ready, tracking when items for an order are picked up for delivery to a service area, and managing billing for each order. In one example, order management controller 152 may include an integrated billing management system or may access a billing management system.

In one example, to perform real-time wait time estimation and prediction of service area availability, management system 150 may implement one or more receivers, such as a receiver 140, for receiving sensed information from one or more sensors within a restaurant. In one example, receiver 140 may include one or more types of receivers enabled to passively or actively read wirelessly transferred data from one or more sensors. In one example, sensors may include battery operated sensors that may actively transfer data to receiver 140, where receiver may connect with the sensors through a touch network or a wireless network implementing one or more standards including, but not limited to, a Bluetooth network and a near field communication (NFC) network. In one example, receiver 140 may include a radio frequency identifier (RFID) receiver, enabled to detect and read sensors that are RFID tags. In one example, RFID may refer to the wireless use of electromagnetic fields to transfer data from an RFID tag to an RFID reader, such as receiver 140. In another example, sensors may include tags that are powered by electromagnetic induction from magnetic fields produced near receiver 140.

In one example, one or more sensors may be placed within a restaurant, with each sensor placed proximate to one or more service areas, referred to as table 110 and table 120. In one example, sensors placed within a restaurant, each placed proximate to one or more service areas, may include, but are not limited to, weight sensors, sound sensors, visual sensors, and radio frequency identifier (RFID) sensors. For example, a weight sensor 112 and a sound sensor 114 are placed proximate to a table 110 and a weight sensor 122 and a sound sensor 124 are placed proximate to a table 120. In additional or alternate embodiments, a restaurant area may include additional or alternate tables and additional or alternate types and amounts of sensors positioned proximate to each. In one example, a sensor may be positioned proximate to a table by being integrated into a device including, but not limited to, the table, a phone, a computer system positioned on the table, and a dish. Each sensor may output one or more types of sensed data and may output one or more unique identifiers for identifying the sensor itself In one or more examples, one or more service areas, whether restaurants or other organizations, where changes to weights and sounds within the service area indicate the progress of the use of the service area by a current party, weight sensor 112 and sound sensor 124 may be positioned in the service area to most accurately measure the changes to weight and sounds for the particular organization.

In one example, each weight sensor, such as weight sensor 112 and weight sensor 122, is placed proximate to a particular table, such as being affixed to or embedded in the table, to enable the weight sensor to detect changes in the weight of the contents placed on the particular table and output data indicating a current weight of the contents placed on the particular table or a delta from a previous weight detected. In one example, weight sensor 112 measures the total weight on a table. In another example, weight sensor 112 measures how empty a table is. In one example, weight sensor 112 detects weight measurements at different times and outputs each weight measurement in a signal identified as a table weight 116. In one example, weight sensor 122 detects weight measurements at different times and outputs each weight measurement in a signal identified as a table weight 126.

In one example, each sound sensor, such as sound sensor 114 and sound sensor 124, is placed proximate to a particular table to enable the sound sensor to detect particular types of sound in the area immediately around the table. In one example, each sound sensor may differentiate between metallic sounds, such as the sound of cutlery, and non-metallic sounds, such as a human voice. In one example, sound sensor 114 detects sounds at different times, selects particular types of sounds, and outputs selected sounds in a signal identified as a table sound 118. In one example, sound sensor 124 detects sounds at different times, selects particular types of sounds, and outputs selected sounds in a signal identified as a table sound 128.

In one example, wait time management controller 154 may implement an association interface 170 through which an identifier of a sensor, sent with data by the sensor, is associated with a table identifier or through which an identifier of a sensor is disassociated with a table. In one example, association interface 170 may manage current sensor identifier associations in a wait database 160. In one example, each table may be identified in wait database 160 by a table identifier, such as table identifier 162 in wait database 160. Through association interface 170, a user may associate an identifier for each sensor placed proximate to each table within a restaurant with a particular table identifier. In one example, wait database 160 may include a separate record added for each table identifier, such as table identifier 162, identifying one or more weight sensors placed proximate to the table associated with the table identifier, by weight sensor identifier 164, and identifying one or more sound sensors placed proximate to the table associated with the table associated with the table identifier, by sound sensor identifier 166. In addition, if a sensor is repositioned from one table to another table or a sensor on a table is replaced, through association interface 170, a user may select to adjust the association of a sensor identifier to a different table identifier or may select to replace the sensor identifier for a table with a new sensor identifier.

In one example, wait time management controller 154 receives inputs to receiver 140 of sensed weight measurements and sounds, such as table weight 116 from weight sensor 112, table weight 126 from weight sensor 122, table sound 118 from sound sensor 114, and table sound 128 from sound sensor 124. Wait time management controller 154 may compare the weight and sound measurements received as inputs from sensors at each table, at multiple times, and track the changes to the weight and sound measurements for each table. Wait time management controller 154 determines, based on the changes to the weight and sound inputs, a progress of the meal at each table and estimates a wait time for use of the table in real-time.

In one example, each weight sensor may detect, and wait time management controller 154 receive, relative changes in the weight on a dining table throughout the duration of a meal. In one example, wait time management controller 154 may receive a first weight measurement from a weight sensor when new customers are first seated at a table to detect a baseline weight of any non-consumable items that may be placed on the table by the new customers. In one example, wait time management controller 154 may detect the first seating weight by detecting a baseline weight for the table with place settings to a first jump in weight. Next, wait time management controller 154 may detect additional weights throughout the duration of a meal and predict, based on increases in weight, when each course is brought to the table, and may distinguish between a smaller weight increase of a first course in comparison with a larger weight increase of a second course. Based on the weight measurements reported by the sensors, wait time management controller 154 may detect additional weights throughout the duration of a meal, as drinks are refilled, as other consumable items are placed on the table, consumable items are consumed from plates reducing the weight on the table, and plates are removed from the table.

In one example, while order management controller 152 may manage the dishes ordered by a customer, not all items brought to a table may be registered through order management controller 152. For example, refills on drinks and other items on a table may not be added to an order for the table as managed by order management controller 152. By detecting weight measurements from weight sensors on the table, wait time management controller 154 may detect and track the progress of a meal, based on the weight of the table, including tracking the progress of items brought to a table but not registered through order management controller 152.

In one example, each sound sensor may detect, and wait time management controller 154 receive, indicators of particular types of sounds throughout the duration of a meal. In one example, wait time management controller 154 may receive a sound signal from a sound sensor when a metal sound from cutlery is detected. Wait time management controller 154 may identify the first metal sound signal received after a table has been newly seated, and mark the first metal sound signal as an indicator that eating has started at the table. Wait time management controller 154 may analyze sound signals in conjunction with weight measurements from weight sensors to monitor a progress of a meal. For example, wait time management controller 154 may determine that when there is a steady decrease in weight measurements in conjunction with consistent metal sound signals indicative of cutlery movement, that a meal is being consumed and may determine that when the weight measurements for a table reach the initial baseline weight or do not change for a period of time in conjunction with few or no metal sound signals received for a period of time, the customers are done consuming a meal.

In one example, wait time management controller 154 may dynamically calculate, based on the progress of the meal time at each table, one or more real-time wait estimates 156, by table. Real-time wait estimates 156, based on weight and sound measurements over time, along with order and billing time estimates provided by order management controller 152, may provide a fair, real-time approximation of the time remaining before a restaurant may use a table for a next customer. Real-time wait estimates 156 may predict a completion time for a meal and a time at which a table will be vacated based on the progress of a meal. In one example, wait time management controller 154 may also manage information about the average weights of particular meal items and information about average wait times for particular meal items and for serving particular sizes of parties, however, wait time management controller 154 is enabled to dynamically adjust, and accurately calculate, real-time wait estimates 156 based on the actual items being consumed at a table and the pace of meal consumption during a particular meal, as calculated from the weights and sounds detected at a table.

In addition, wait time management controller 154 may monitor, and dynamically adjust real-time wait estimates 156, based on a number of users already on a wait list for a restaurant, where wait time management controller 154 may provide an interface through which a user, or hostess on a behalf of a user, may place users on a wait list for the restaurant. In addition, wait time management controller 154 may monitor, and adjust real-time wait estimates 156 based on the table sizes requested by users already on a wait list for a restaurant, where each table identifier in wait database 160 may also include a maximum seating capacity. In one example, providing customers with accurate, real-time wait list estimates is important for customer retention because if an estimated wait time is too short, customers may become frustrated with longer than expected waits, and decide not to return to the restaurant. In addition, in one example, providing customers with accurate, real-time wait list estimates is important when a restaurant has tables available immediately, to keep tables filled and increase the productivity of the restaurant.

Wait time management controller 154 may output the real-time wait estimates, by table, as real-time wait time estimates 156. In one example, real-time wait time estimates 156 may be output to one or more systems for output to potential customers. In one example, real-time wait time estimates 156 may be broadcast, where devices enabled to receive broadcasts of real-time wait time estimates 156 may detect and publish the data. In another example, real-time wait time estimates 156 may be output to one or more specific hardware devices. In one example, real-time wait time estimates 156 may be output to one or more databases or services, for access by one or more applications or services.

In one example, real-time wait time estimates 156 may be output to a global positioning system (GPS) restaurant service 158 that integrates wait time estimates from one or more restaurants into a service that provides real-time wait estimates of one or more restaurants detected within a particular proximity of a particular user's specified location. In one example, a user's specified location may include a current location, as detected by a GPS component for GSP restaurant service 156. In another example, a user's specified location may include a future location, as specified by a user. In one example, GPS restaurant service 158 may represent an application specified for running on a mobile computing device enabled with a GPS sensor.

In one example, by wait time management controller 154 calculating and outputting real-time wait time estimates 156 to GPS restaurant service 158, a restaurant may optimize table management to potentially increase profitability. In one example, by providing customers with real-time wait estimates 156 through GPS restaurant service 158, a customer may receive real-time wait estimates, by restaurant, for a particular party size, without needing to call or walk in to the restaurant, which provides the customer with greater predictability for a wait time at the restaurant and provides the restaurant with the opportunity to optimize table management through publishing real-time wait time estimates.

In another example, real-time wait time estimates 156 may be output to a wait list service 159 that monitors, once a user has selected to enter a wait list, the user's position on the wait list. In one example, wait list service 159 may update each user's wait list entry with an estimated wait time for the user based on the user's position in the wait list and real-time wait time estimates 156.

In one example, existing wait list services, such as wait list service 159, may implement hardware devices, such as pagers or buzzers, that a customer is handed when the customer is placed on a wait list, and that automatically buzz or provide another notification when a table is available for the customer, however, generally pagers or buzzers do not provide customers with real-time wait estimates. In one example, wait list service 159 may be updated to receive real-time wait time estimates 156 and to provide notifications to customers, through the pagers or buzzers, of the real-time wait estimates 156, through one or more output interfaces of the pager or buzzer, to provide customers with accurate information about the amount of time the customer will need to wait, through existing pagers or buzzers.

Figure 2:
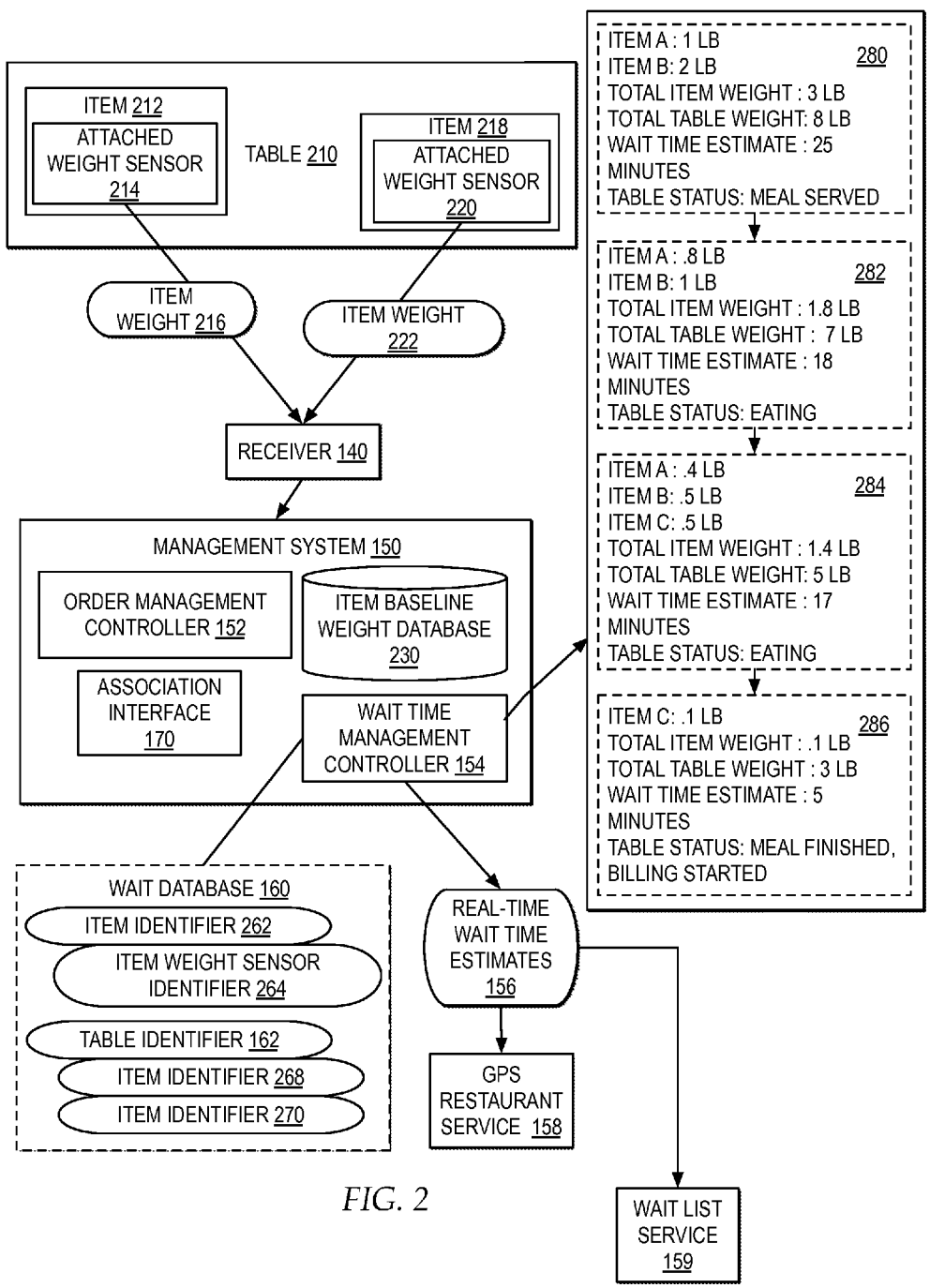
FIG. 2 illustrates one example of a block diagram of a system for real-time wait time estimation and prediction via sensors attached to individual serving items.

FIG. 2 illustrates a block diagram of one example of a system for real-time wait time estimation and prediction via sensors attached to individual serving items.

In one example, wait time management controller 154 may receive weight information about the weight of individual items delivered to tables within a restaurant. In one example, wait time management controller 154 may receive the weight information about the weights of individual serving items only or may receive the weight information about the weights of individual serving items and also receive one or more of weight measurements and sound information for one or more tables within a restaurant as illustrated in FIG. 1.

In one example, one or more sensors may be attached to each serving item to detect changes in the weight of individual serving items, as consumable items in the serving item is consumed, and to output the item weight. In one example, receiver 140 of management system 150 reads outputs from one or more item weight sensors attached to individual serving items. In one example, attached weight sensor 214 is attached to item 212 delivered to a table 210 and attached weight sensor 220 is attached to item 218 delivered to table 210. In one example, attached weight sensor 214 periodically outputs an item weight 216 indicating a current weight or change in weight of item 212, read by receiver 140, and attached weight sensor periodically outputs an item weight 222 indicating a current weight or change in weight of item 218.

In one example, wait item management controller 154 may manage entries in wait database 160 to associate an item identifier 262 for a particular item, such as item 212 or item 218, to an item weight sensor identifier 264, such as an identifier for attached weight sensor 214 or attached weight sensor 220. In one example, wait time management controller 154 may manage association interface 170 through which a user or scanning device may input item weight sensor identifier 264 for association with item identifier 262. In one example, association interface 170 may include a scanning device that may scan a weight sensor attached to an item and associate the scanned weight sensor identifier with the item in wait database 160. In another example, wait time management controller 154 may access a database of item weight sensor identifiers and automatically assign a particular item weight sensor identifier to a particular item in wait database 160. In one example, item weight sensors may only be temporarily attached to a particular item, wherein each item weight sensor may be removed from an item when a customer is finished with the item and attached to a new item as part of a next customer order, wherein wait time management controller 154 updates wait database 160 to identify a current association of item identifier 262 with item weight sensor identifier 264. For example, as a server is preparing dishes to take out to a table, the server may scan the item weight sensors for the table through a scanner of association interface 170. In one example, item weight sensors may be affixed to an item for reuse in association with the item. In addition, as items are removed from a table and prepared to be washed, association interface 170 may implement another scanner to detect the item weight sensor identifiers for each weight sensor attached to completed items and remove the item weight sensor identifier association from item identifier 262 in wait database 160 or set a flag for the item identifier 262 indicating the item has been removed from the table for the current order.

In one example, wait time management controller 154 may also manage association of one or more item identifiers or item weight sensor identifiers with one or more table identifiers in wait database 160. In one example, a table identifier 162 is an identifier for table 210. In one example, wait database 160 may connect with order management controller 152 to determine the identifiers of items placed as part of an order for table 210 and to update table identifier 162 in wait database 160 with identifiers for each of item 212 and item 218 set for delivery to table 210. For example, item identifier 268 may identify item 212 and item identifier 270 may identify item 218, where the item identifiers are associated with table identifier 162 in wait database 160, and where each item identifier is then associated with an item weight sensor identifier for a sensor currently attached to the item when it is ready for delivery to table 210.

In one example, wait time management controller 154 may receive item weight 216 and item weight 222, each including an item weight sensor identifier and a weight, and determine, based on an entry in wait database 160, the item associated with the item weight sensor identifier and the table associated with the item. Wait time management controller 154 may track the progress of an item being consumed, as the weight of the item decreases, and may track refills to an item, if the item weight increases after decreasing. In addition, wait time management controller 154 may access an item baseline weight database 230 to determine the baseline weight of the container in which consumable product is typically placed, such as the baseline weight of a plate. Wait time management controller 154 may record a first weight reported by a weight sensor for an item as the maximum weight, and subtract the baseline weight of the container in which the consumable portion of the item is typically placed, to determine a weight of the consumable portion of the item. Wait time management controller 154 may then track the remaining consumable portion of an item, estimate a remaining amount of time to consume a particular item, and detect when a particular item is fully consumed or has been set aside, when there are no changes in weight over a period of time.

In addition, management system 150 may track, for each order placed for a table, by table identifier, through order management controller 152, the progress of preparation of items for each table, the items delivered to each table, and the number of items remaining to be prepared and delivered to each table. Management system 150 may further track, through wait time management controller 154, based on the item weight information, the progress of consumption of each item delivered to each table and the progress of clearing items from a table. Wait time management controller 154 may monitor, based on the progress of preparation of items for each table, the items remaining to be delivered to a table, and the progress of consumption of items at a table, real-time wait time estimation and prediction of the table availability within the restaurant, output as real-time wait estimates 156. In addition, wait time management controller 154 may combine weight and sound sensor information as illustrated in FIG. 1, for a table, with the item weight sensor information for particular items delivered to the table to fine tune real-time wait time estimation and prediction of table availability within the restaurant, output as real-time wait estimates 156.

In one example, wait time management controller 154 may track, calculate, and output, for each order placed for a table, real time item weights, wait time estimates, and table status. For example, at reference numeral 280, wait time management controller 154 may track a weight of "item A", which may refer to item 212, of "1 lb", a weight of "item B", which may refer to item 218, of "2 lb", a total weight of the items of "3 lb", and a total table weight, as reported by weight sensor 112, of "8 lb". In one example, the 5 lb difference between the total item weight and the total table weight may represent the weight of non-consumable items placed on the table by the customers and may represent the weight of consumable or non-consumable items brought to the table that do not include weight sensors. In one example, at reference numeral 280, wait time management controller 154 may calculate, based on the individual item weights and total table weight, using average times for consumable item consumption, a wait time estimate for the table to be available for a next customer of "25 minutes" and track a table status of "meal served".

In a next example, at reference numeral 282, wait time management controller 154 may track a decreasing weight of "item A" to 0.8 lb, a decreasing weight of "item B" to 1 lb, and a decreasing total table weight of "7 lb", however, the total table weight decrease does not reflect the total item weight decrease, indicating that additional weight may have been added to the table. In the example, at reference numeral 282, wait time management controller 154 may calculate, based on the individual item weights and total table weight, using a rate of consumption based on the real-time rate of weight decrease of individual items at the table, a wait time estimate for the table to be available for a next customer decreasing to "18 minutes" and track a table status of "eating".

In a next example, at reference numeral 284, wait time management controller 154 may track a decreasing weight of "item A" to 0.4 lb, a decreasing weight of "item B" to 0.5 lb, a new item "item C" of 0.5 lb, and a decreasing total table weight of "5 lb". In the example, at reference numeral 284, wait time management controller 154 may calculate, based on the individual item weights, including a new item, and total table weight, using a rate of consumption based on the real-time rate of weight decrease of individual items at the table, a wait time estimate for the table to be available for a next customer decreasing to "17 minutes" and track a table status of "eating".

In a next example, at reference numeral 286, wait time management controller 154 may track that "item A" and "item B" are no longer at the table, a reduced weight of item "item C" of 0.1 lb, and a decreasing total table weight of "3 lb". In the example, at reference numeral 284, wait time management controller 154 may calculate, based on the amount of time that an individual table weight has remain unchanged, the total table weight in comparison with the baseline weight for the table, and average time to process and pay a bill, a wait time estimate for the table to be available for a next customer decreasing to "5 minutes" and track a table status of "meal finished, billing started".

In addition, as management system 150 detects each item weight on each table, management system 150 may access one or more nutrition aspects of each item, calculate a percentage of an item consumed based on the weight, calculate the nutritional value of the percentage of an item consumed based on the nutrition aspects, and output one or more of the nutrition aspects, percentage of item consumed, and calculated nutritional value of the percentage of an item consumed. In one example, management system 150 may locally broadcast the information, such that electronic devices accessible to customers at the table may receive the broadcast information and output the information to the customers through one or more output interfaces of the electronic devices. For example, customers may carry electronic devices enabled to receive locally broadcast Bluetooth transmissions, such as portable phones or portable watches, and to output the broadcasted information to the customers.

Figure 3:
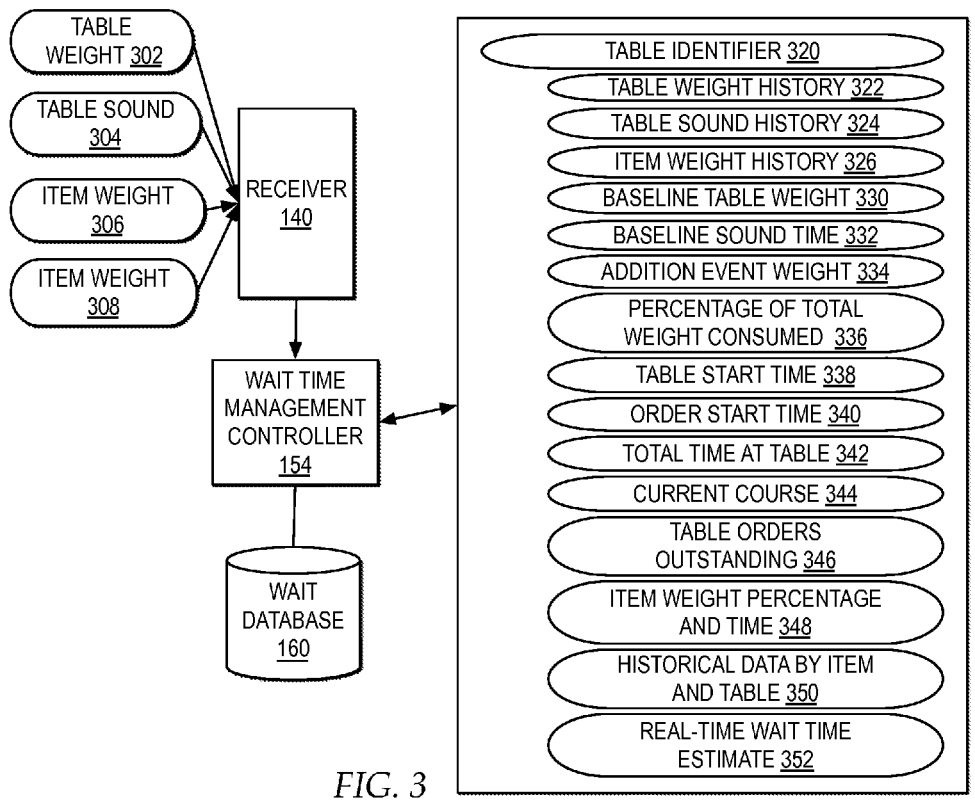
FIG. 3 illustrates one example of a block diagram of a wait time management controller for a restaurant receiving weight and sound information for a table over time and generating a real-time estimate of availability for a particular table within a restaurant.

FIG. 3 illustrates one example of a block diagram of a wait time management controller for a restaurant receiving weight and sound information for a table over time and generating a real-time estimate of availability for a particular table within a restaurant.

In one example, receiver 140 detects wirelessly transmitted data from sensors associated with one or more tables, as illustrated in FIG. 1 and FIG. 2. In one example, for the purposes of illustration, receiver 140 may receive a table weight 302 with a sensor identifier, a table sound 304 with a sensor identifier, an item weight 306 with a sensor identifier, and an item weight 308 with a sensor identifier for items associated with an order at the table. In additional or alternate examples, receiver 140 may receive multiple table weights and multiple table sounds, from a selection of multiple tables, and first group selections of the table weight and table sounds that have a same table identifier.

Receiver 140 may pass the sensor data received for a particular table to wait time management controller 154. Wait time management controller 154 searches wait database 160 with the received sensor data and determines one or more table identifiers assigned to the sensor reporting table weight 302, assigned to the sensor reporting table sound 304, assigned to the sensor reporting item weight 306, and assigned to the sensor reporting item weight 308.

In one example, the received sensor data may be added to a record for the table identifier, such as table identifier 320, within wait database 160. In one example, as sensors associated with tables and items report sensed data over time, wait time management controller 154 may update a history of sensed data according to table identifier and type of sensed data within wait database 160. For example, table weight 302 may be added to table weight history 302 associated with table identifier 320, table sound 304 may be added to table sound history 324, and item weight 306 and item weight 308 may be added to item weight history 326.

In one example, wait time management controller 154 may manage and compute multiple types of information to provide real-time wait estimation and prediction of table availability for a particular table. In one example, wait time management controller 154 may detect when a table has been cleared and reset one or more of the values stored in wait database 160 in association with the table identifier for the table. In one example, wait time management controller 154 may detect when a table has been reset based on one or more available inputs including, but not limited to, order management controller 152 indicating that a table check has been paid, an input to an interface indicating that a table has been cleared or is ready to be reseated, detecting table weight 302 indicating no weight on the table for a threshold period of time, and other available inputs that indicate that a table is available for a new party.

In addition, wait time management controller 154 may detect a next weight change from table weight 302, after a table has been reset, and set the next weight change as a baseline table weight 330, in association with table identifier 230. In one example, wait time management controller 154 may wait to detect a next weight change of a particular percentage or threshold before setting baseline table weight 330, where baseline table weight 330 represents the weight of non-consumable items from customers placed on the table or the average weight of customers resting on the table. In one example, wait time management controller 154 may use a time at which baseline table weight 330 is set for tracking the start of when a table is in use. In addition, wait time management controller 154 may use the weight stored in baseline table weight 330 as the minimum weight for the table to track against for the particular party, for tracking the progress of the particular party at the table. In addition, wait time management controller 154 may detect when the table weight is less than baseline table weight 330 and detect that a table is being reset.

In addition, wait time management controller 154 may detect a next metal sound from table 304, after a table has been reset, and set the next metal sound and the time detected as a baseline sound time 332, in association with table identifier 230. In one example, a metal sound detected after a table has been reset may be indicative that a meal has started. Wait time management controller 154 may use baseline sound time 332 as an indicator of when a meal started and may monitor table sound history 324 for indictors that metal sounds are no longer being heard, as an indicator that current guests have finished a meal.

Wait time management controller 154 may detect, for each table weight 302 reported after baseline table weight 330 has been set, whether the table weight is an increase or decrease from the previous table weight reported for the table. In one example, for each increase in table weight detected, wait time management controller 154 may set a record in addition event weight 334 to record each additional consumable item detected, to monitor a total table weight. In addition, for each decrease in table weight detected, wait time management controller 154 may dynamically adjust a percentage of the total weight consumed 336, which reflects of a percentage of the weight reduced from the difference between the total table weight measured reduced by baseline table weight 330. In addition, to calculating a total table weight and reduction in table weight based on reports of table weight 302, wait time management controller 154 may monitor the percentage of table weight by item, and the percentage of each item consumed 348, based on monitoring changes to item weight 306 and item weight 308.

In one example, wait time management controller 154 may also detect an indicator of when a table is designated for a new party, and set the time that the table is designated for a new party, as table start time 338. In one example, table start time 338 may be set based one or more indicators. In one example, a user may input, through an input interface of wait time management controller 154, a time at which a table is selected for a new party, and the time of the input is stored as table start time 338. In another example, table start time 338 may be set at the time that baseline table weight 330 is stored.

In one example, wait time management controller 154 may also detect an indicator of when an order is entered as order start time 340. In one example, order start time 340 may be set when order management controller 152 indicates that an order has been entered for a particular table. In one example, wait time management controller 154 may use order start time 340 as a base time to which to add expected times for preparing the items specified in an order, expected times for service of items in the order, and expected times for consuming the items specified in the order.

In one example, wait time management controller 154 may calculate a total time that a party has been at a table, based on the difference between order start time 340 and a current time. In one example, total table time 342 may include a counter, which is started when order start time 340 is set, to calculate a total time at the table. In one example, order start time 340 and total time at table 342 may be combined. In one example, wait time management controller 154 may use total table time 342 to monitor the total actual time that a party has used a table, to compare against the estimated wait time for the table and to dynamically adjust a real-time wait time estimate for the table.

In one example, wait time management controller 154 may monitor, based on order information for each table from order management controller 152, which course has been served to a table, as current course 344, and may monitor, based on order information for each table from order management controller 152, a number of orders placed for a table that have not yet been delivered, as table orders outstanding 346. In one example, current course 344 may include multiple course indicators specified for the typical courses served to guests of a restaurant and the order of the courses. In addition, each course may include average service times associated with serving and clearing each course. In one example, by wait time management controller 154 tracking current course 344 and table orders outstanding 346, in combination with the other data tracked, wait time management controller 154 may determine the number of courses remaining and estimate in real-time the amount of time required for use of the table to receive each of items in the remaining courses.

In one example, wait time management controller 154 may track, based on item weight history 326 collected from item weights reported for a particular table, a percentage of each item weight that has been consumed and the time from when the item was detected to a current time, as item weight percentage and time 348. In one example, wait time management controller 154 may update item weight percentage and time 348 each time item weight history 326 is updated with an updated item weight.

In one example, wait time management controller 154 may update and access historical data by item and table 350 collected about different aspects of the time required for guests to eat a meal at a table from start to finish. In one example, historical data by item and table 350 may include historical averages of the time required from the table start time to a time when an order is typically taken, to a time when orders are typically served depending on the types of items, to a time for each course to be prepared and consumed depending on the type of course and types of items, to a time for each course to be cleared, to a time for each party to pay a check. In one example, depending on a layout of a restaurant, certain tables may require additional service time for bringing items to the table, where historical data by item and table 350 may include historical data indicating differences in service time by table that are location dependent or server dependent.

In one example, wait time management controller 154 collects one or more of table weight history 322, table sound history 324, item weight history 326, baseline table weight 330, baseline sound time 332, addition event weight 334, percentage of total weight consumed 336, table start time 338, order start time 340, total time at table 342, current course 344, table orders outstanding 346, item weight percentage and time 348, historical data by item and table 350, and one or more additional inputs, and calculates a real-time wait time estimate 352 for a particular table. In the example, wait time management controller 154 may fine tune the time in real-time wait time estimate 352 based on multiple real-time factors including the real-time rate of consumption of consumable items, as detected by the change in weight on a table and change in weight of individual items, along with the real-time orders placed and time taken to fulfill orders.

Figure 4:
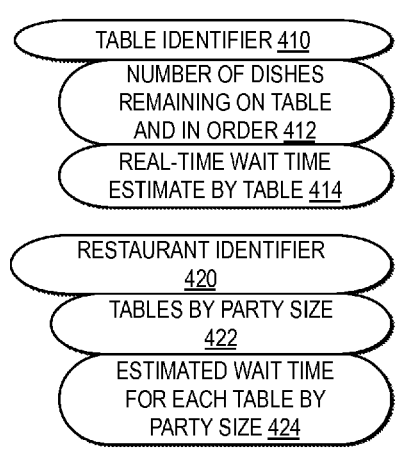
FIG. 4 illustrates one example of a block diagram of a wait time management controller for aggregating real-time wait time estimates based on table size requirements for a particular user.

FIG. 4 illustrates one example of a block diagram of a wait time management controller for aggregating real-time wait time estimates based on table size requirements for a particular user.

In one example, wait time management controller 154 may filter and aggregate data, such as the data managed by wait time management controller 154 in FIG. 3, for output to different interfaces. In one example, one or more output interfaces may include one or more interfaces visible to a restaurant entity in one or more locations within a restaurant venue. In another example, one or more output interfaces may include one or more interfaces of wait list service 159 or of GPS restaurant service 158. In one example, another output interface may include an interface visible to a particular potential customer.

In one example, wait time management controller 154 may filter the data collected by table identifier as illustrated in FIG. 3 into a record for a table identifier 410 with a number of dishes remaining on a table, by weight percentage, and the number of dishes remaining to be served for a particular order, as illustrated by reference numeral 412. In addition, wait time management controller 154 may filter real-time wait time estimate 352 for a particular table into a filtered real-time wait estimate by table 414.

In one example, wait time management controller 154 may filter the data into a record for a restaurant identifier 420 for a particular restaurant. In one example, restaurant identifier 420 may include a number of tables by party size 422. In one example, wait time management controller 154 may further filter a selection of tables included in tables by party size 422 for output based on selection criteria set for a restaurant about which tables to include for a particular time period. In one example, the selection criteria set for a restaurant about which tables to include in tables by party system 422 for a particular time period may remove tables that are reserved for specific parties or are not part of the tables to be included in the wait time estimates published for the restaurant.

In one example, wait time management controller 154 may aggregate each real-time wait estimate 352 for each of the tables in tables by party size 422 into an estimated wait time for each table by party size 424. In one example, by aggregating reach real-time wait estimate 352 for each of the tables in tables by party size 422 into an estimated wait time for each table, estimated wait time for each table by party size 424 may be output to wait list service 159, for dynamically updating the real-time wait time estimate for each party already on a wait list based on the table size reserved, and may be output to GPS restaurant service 158 for providing a real-time wait time estimate for parties requesting information about wait times for a restaurant, which may be further specified by table size.

Figure 5:
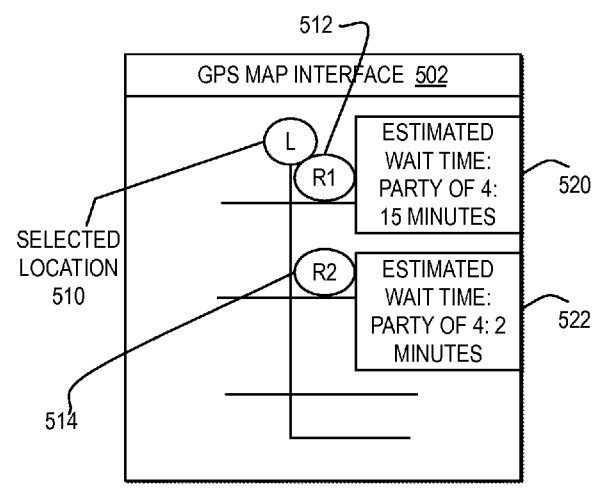
FIG. 5 illustrates one example of a block diagram of an output interface for a GPS restaurant service specifying real-time wait time estimates for restaurants within a particular proximity of a location selected by a user.

FIG. 5 illustrates one example of a block diagram of an output interface for a GPS restaurant service specifying real-time wait time estimates for restaurants within a particular proximity of a location selected by a user.

In one example, a GPS map interface 502 is one example of an output interface of GPS restaurant service 158. In one example, GPS restaurant service 158 receives an input of a selected location 510, which identifies a location selected by the user. In one example, selected location 510 is a user's current location, as detected by a GSP monitoring tool of GPS restaurant service 158. In another example, selected location 510 is another location specified by a user.

In one example, GPS restaurant service 158 receives records for each restaurant within a particular area, where each record may identify one or more of restaurant identifier 420, tables by party size 422, and the real-time estimated wait time for each table by party size 424. In one example, each restaurant may broadcast, within a local broadcast area, one or more of restaurant identifier 420, tables by party size 422, and estimated wait time for each table by party size 424, where a portable wireless device may locally receive the broadcast data, and GPS restaurant service 158, running as an application on a GPS enabled wireless device, may integrate the broadcast information into GPS map interface 502. In another example, each restaurant may transmit one or more of restaurant identifier 420, tables by party size 422, and estimated wait time for each table by party size 424, to one or more server systems, where GPS restaurant service 158, running as an application on a GPS enabled wireless device, may access the information from the server system and integrate the accessed information into GPS map interface 502.

In one example, GPS restaurant service 158 receives, from a restaurant identified as "R1", illustrated within GPS map interface 502 at a position illustrated by reference numeral 512, an estimated wait time for each table by party size 424, specified for R1, and filters the estimated wait time for each table for a party of 4. GPS restaurant service 158 may output the filtered estimated wait time for each table for a party of 4 in a textual interface 520 of GPS map interface 502, where for example, a real-time estimated wait time for a party of 4 at restaurant "R1" is "15 minutes". In another example, GPS restaurant service 158 may receive, from a restaurant identified as "R2", illustrated within GPS map interface 502 at a position illustrated by reference 514, an estimated wait time for each table by party size 424, specified for R2, and filters the estimated wait time for each table for a party of 4. GPS restaurant service 158 may output the filtered estimated wait time for each table for a part of 4 in a textual interface 522 of GPS map interface 502, where for example, a real-time estimated wait time for a party of 4 at restaurant "R2" is "2 minutes". In another example, estimated wait times may be output as audio indicators, tactile indicators, or through other output interfaces.

In the example, while restaurant "R1", at the position illustrated at reference numeral 512, is positioned closer to selected location 510 than restaurant "R2", at the position illustrated at reference numeral 514, the real-time estimated wait time for a party of 4 at restaurant "R2" is less than the real-time estimated wait time for a party of 4 at restaurant "R1". In addition, GPS restaurant service 158 may receive updates to the real-time estimated wait times for a party of 4 for each of the restaurants and dynamically update textual interface 520 and textual interface 522 as updates are received. In addition, GPS restaurant service 158 may receive information about traffic and estimated travel times between a selected location 510 and restaurant locations such as "R1" and "R2" and update GPS map interface 502 with the traffic and estimated travel times, including the feasibility of a user arriving at a restaurant location in time to be seated at a table if the user selects join a wait list or make a reservation. In one example, while the estimated wait time for a party of 4 at restaurant "R1" is longer than the estimated wait time for a party of 4 at restaurant "R2", the traffic between selected location 510 and restaurant "R2" may include delays, which could be a delay longer than the wait at restaurant "R1", which may provide the user with incentive to select to join the wait list at restaurant "R1".

In one example, a user may select textual interface 520 to select to join the wait list of a table at restaurant "R1" and may select textual interface 522 to select to join the wait list of a table at restaurant "R2". In one example, GPS restaurant service 158 may interface with wait list service 159 for a selected restaurant to add a user to a wait list for a selected restaurant. Once wait list service 159 confirms the user is added to the wait list, GPS map interface 502 may continue to receive updates to the real-time estimated wait times for the party of 4 for the wait list. In one example, wait list service 159 may also manage reservations, where a user may select, via GPS map interface 502 to request a reservation for a restaurant, as an alternative to joining the wait list for the restaurant.

In additional or alternate embodiments, GPS map interface 502 may include additional or alternate information, such as, but not limited to, restaurant reviews. In addition, GPS map interface 502 may reflect one or more filters applied by GPS restaurant service 158, such as, but not limited to, a filter specifying a type of restaurant, restaurant rating requirement, and restaurant cost.

FIG. 6 illustrates a block diagram of one example of a computer system in which one embodiment of the invention may be implemented. The present invention may be performed in a variety of systems and combinations of systems, made up of functional components, such as the functional components described with reference to a computer system 600 and may be communicatively connected to a network, such as network 602.

Computer system 600 includes a bus 622 or other communication device for communicating information within computer system 600, and at least one hardware processing device, such as processor 612, coupled to bus 622 for processing information. Bus 622 preferably includes low-latency and higher latency paths that are connected by bridges and adapters and controlled within computer system 600 by multiple bus controllers. When implemented as a server or node, computer system 600 may include multiple processors designed to improve network servicing power.

Processor 612 may be at least one general-purpose processor that, during normal operation, processes data under the control of software 650, which may include at least one of application software, an operating system, middleware, and other code and computer executable programs accessible from a dynamic storage device such as random access memory (RAM) 614, a static storage device such as Read Only Memory (ROM) 616, a data storage device, such as mass storage device 618, or other data storage medium. Software 650 may include, but is not limited to, code, applications, protocols, interfaces, and processes for controlling one or more systems within a network including, but not limited to, an adapter, a switch, a server, a cluster system, and a grid environment.

Computer system 600 may communicate with a remote computer, such as server 640, or a remote client. In one example, server 640 may be connected to computer system 600 through any type of network, such as network 602, through a communication interface, such as network interface 632, or over a network link that may be connected, for example, to network 602.

In the example, multiple systems within a network environment may be communicatively connected via network 602, which is the medium used to provide communications links between various devices and computer systems communicatively connected. Network 602 may include permanent connections such as wire or fiber optics cables and temporary connections made through telephone connections and wireless transmission connections, for example, and may include routers, switches, gateways and other hardware to enable a communication channel between the systems connected via network 602. Network 602 may represent one or more of packet-switching based networks, telephony based networks, broadcast television networks, local area and wire area networks, public networks, and restricted networks.

Network 602 and the systems communicatively connected to computer 600 via network 602 may implement one or more layers of one or more types of network protocol stacks which may include one or more of a physical layer, a link layer, a network layer, a transport layer, a presentation layer, and an application layer. For example, network 602 may implement one or more of the Transmission Control Protocol/Internet Protocol (TCP/IP) protocol stack or an Open Systems Interconnection (OSI) protocol stack. In addition, for example, network 602 may represent the worldwide collection of networks and gateways that use the TCP/IP suite of protocols to communicate with one another. Network 602 may implement a secure HTTP protocol layer or other security protocol for securing communications between systems.

In the example, network interface 632 includes an adapter 634 for connecting computer system 600 to network 602 through a link and for communicatively connecting computer system 600 to server 640 or other computing systems via network 602. Although not depicted, network interface 632 may include additional software, such as device drivers, additional hardware and other controllers that enable communication. When implemented as a server, computer system 600 may include multiple communication interfaces accessible via multiple peripheral component interconnect (PCI) bus bridges connected to an input/output controller, for example. In this manner, computer system 600 allows connections to multiple clients via multiple separate ports and each port may also support multiple connections to multiple clients.

In one embodiment, the operations performed by processor 612 may control the operations of flowchart of FIGS. 7-14 and other operations described herein. Operations performed by processor 612 may be requested by software 650 or other code or the steps of one embodiment of the invention might be performed by specific hardware components that contain hardwired logic for performing the steps, or by any combination of programmed computer components and custom hardware components. In one embodiment, one or more components of computer system 600, or other components, which may be integrated into one or more components of computer system 600, may contain hardwired logic for performing the operations of flowcharts in FIGS. 7-14.

In addition, computer system 600 may include multiple peripheral components that facilitate input and output. These peripheral components are connected to multiple controllers, adapters, and expansion slots, such as input/output (I/O) interface 626, coupled to one of the multiple levels of bus 622. For example, input device 624 may include, for example, a microphone, a video capture device, an image scanning system, a keyboard, a mouse, or other input peripheral device, communicatively enabled on bus 622 via I/O interface 626 controlling inputs. In addition, for example, output device 620 communicatively enabled on bus 622 via I/O interface 626 for controlling outputs may include, for example, one or more graphical display devices, audio speakers, and tactile detectable output interfaces, but may also include other output interfaces. In alternate embodiments of the present invention, additional or alternate input and output peripheral components may be added.

With respect to FIG. 6, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that the hardware depicted in FIG. 6 may vary. Furthermore, those of ordinary skill in the art will appreciate that the depicted example is not meant to imply architectural limitations with respect to the present invention.

FIG. 7 illustrates a high level logic flowchart of a process and computer program product for specifying sensors for tables and items in a restaurant.

In one example, the process and program start at block 700 and thereafter proceeds to block 702. Block 702 illustrates a determination whether a sensor ID is received for updating. In one example, a sensor ID may be received from a user entry of a sensor ID, a user scanning a sensor ID with a request to reset the sensor ID, or a reader detecting a new sensor ID. At block 702, when a sensor ID for update is received, the process passes to block 704. Block 704 illustrates prompting a user to indicate the table and item association with the sensor ID. Next, block 706 illustrates a determination whether a table or item association input is received. At block 706, if a table or item association input is received, then the process passes to block 708. Block 708 illustrates associating the sensor ID with the selected table or item selected by the user, and the process ends.

FIG. 8 illustrates a high level logic flowchart of a process and computer program product for receiving and storing sensor outputs.

In one example, the process and program starts at block 800 and thereafter proceeds to block 802. Block 802 illustrates a determination whether a sensor output is received. At block 802, if a sensor output is received, then the process passes to block 804. Block 804 illustrates searching a database for the sensor ID specified in a sensor output to identify a table ID associated with the sensor ID. Next, block 806 illustrates a determination whether an associated table ID is identified. At block 806, if an associated table ID is not identified, then the process ends. At block 806, if an associated table ID is identified, then the process passes to block 808. Block 808 illustrates storing the sensor output in one of a table weight history, a table sound history, or an item weight history for the table ID according to the type of sensor output, and the process ends.

Figure 9:
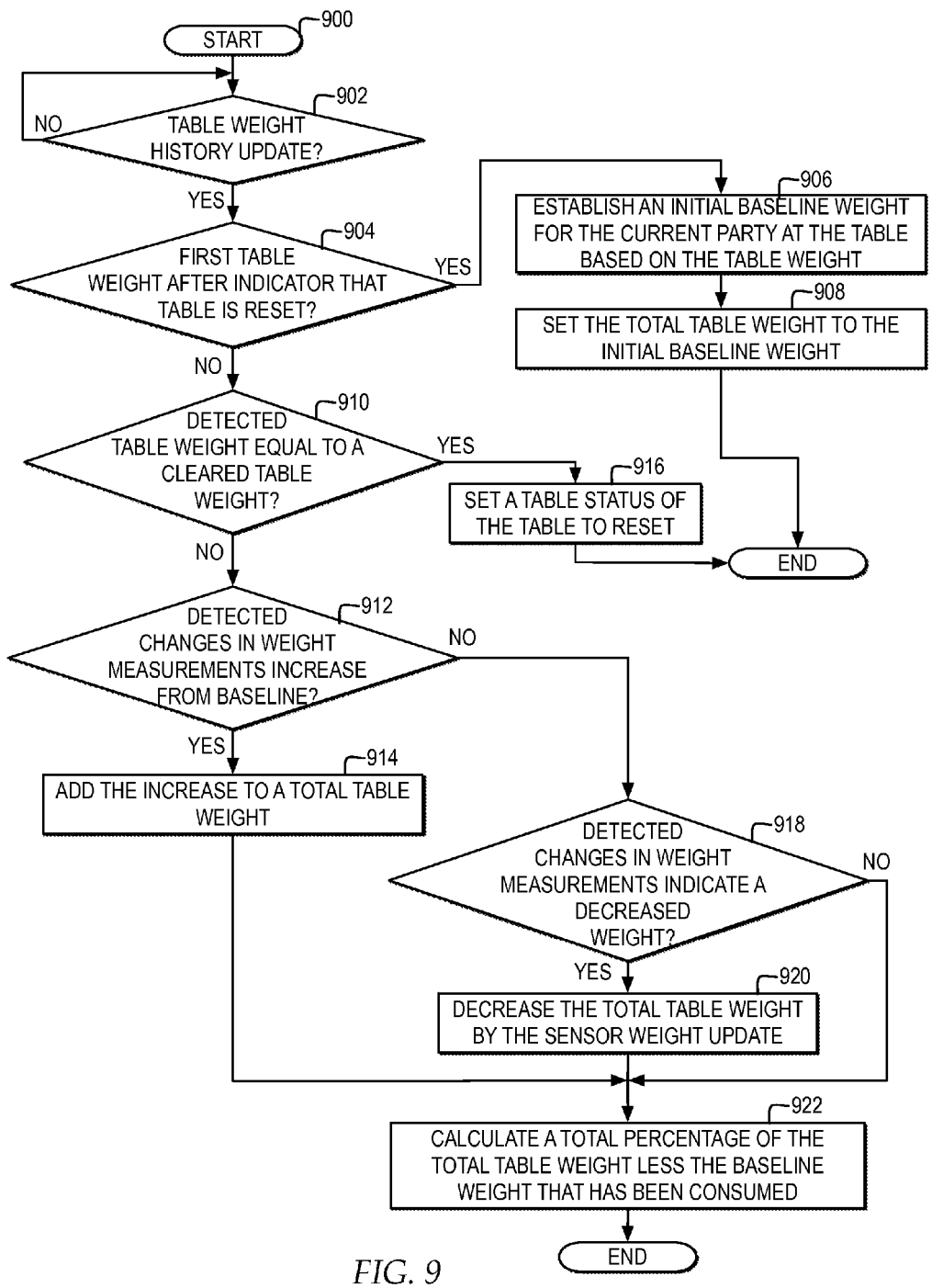
FIG. 9 illustrates a high level logic flowchart of a process and computer program product for monitoring a table status based on table weight sensor outputs.

FIG. 9 illustrates a high level logic flowchart of a process and computer program product for monitoring a table status based on table weight sensor outputs.

In one example, the process and program starts at block 900 and thereafter proceeds to block 902. Block 902 illustrates a determination whether a table weight history update is received. At block 902, if a table weight history is updated by a new sensor output, then the process passes to block 904. Block 904 illustrates a determination whether the update is a first table weight after an indicator that the table is reset. At block 904, if the update is a first table weight after an indicator that the table is reset, then the process passes to block 906. Block 906 illustrates establishing an initial baseline weight for the current party at the table based on the table weight. Next, block 908 illustrates setting the total table weight to the initial baseline weight, and the process ends.

Returning to block 904, if the update is a first table weight after an indicator that the table is reset, then the process passes to block 910. Block 910 illustrates a determination whether the detected table weight from the sensor output is equal to a cleared table weight set for the table. At block 910, if the detected table weight is equal to a cleared table weight set for the table, then the process passes to block 916. Block 916 illustrates setting a table status of the table to reset, and the process ends.

Returning to block 910, if the detected table weight is not equal to a cleared table weight set for the table, then the process passes to block 910. Block 910 illustrates detecting whether changes in weight measurements have increased from the baseline weight. At block 912, if changes in weight have increased from the baseline weight, then the process passes to block 914. Block 914 illustrates adding the increase to a total table weight. Next, block 922 illustrates calculating a percentage of the total table weight less the baseline weight that has been consumed, and the process ends.

Returning to block 912, if changes in weight have not increased from the baseline weight, then the process passes to block 918. Block 918 illustrates a determination whether the detected changes in weight measurement indicate a decreased weight. At block 918, if the detected changes in weight measurement do not indicate a decreased weight, then the process passes to block 922. At block 918, if the detected changes in weight measurement do indicate a decreased weight, then the process passes to block 920.

Block 920 illustrates decreasing the total table weight by the sensor weight update, and the process passes to block 922.

Figure 10:
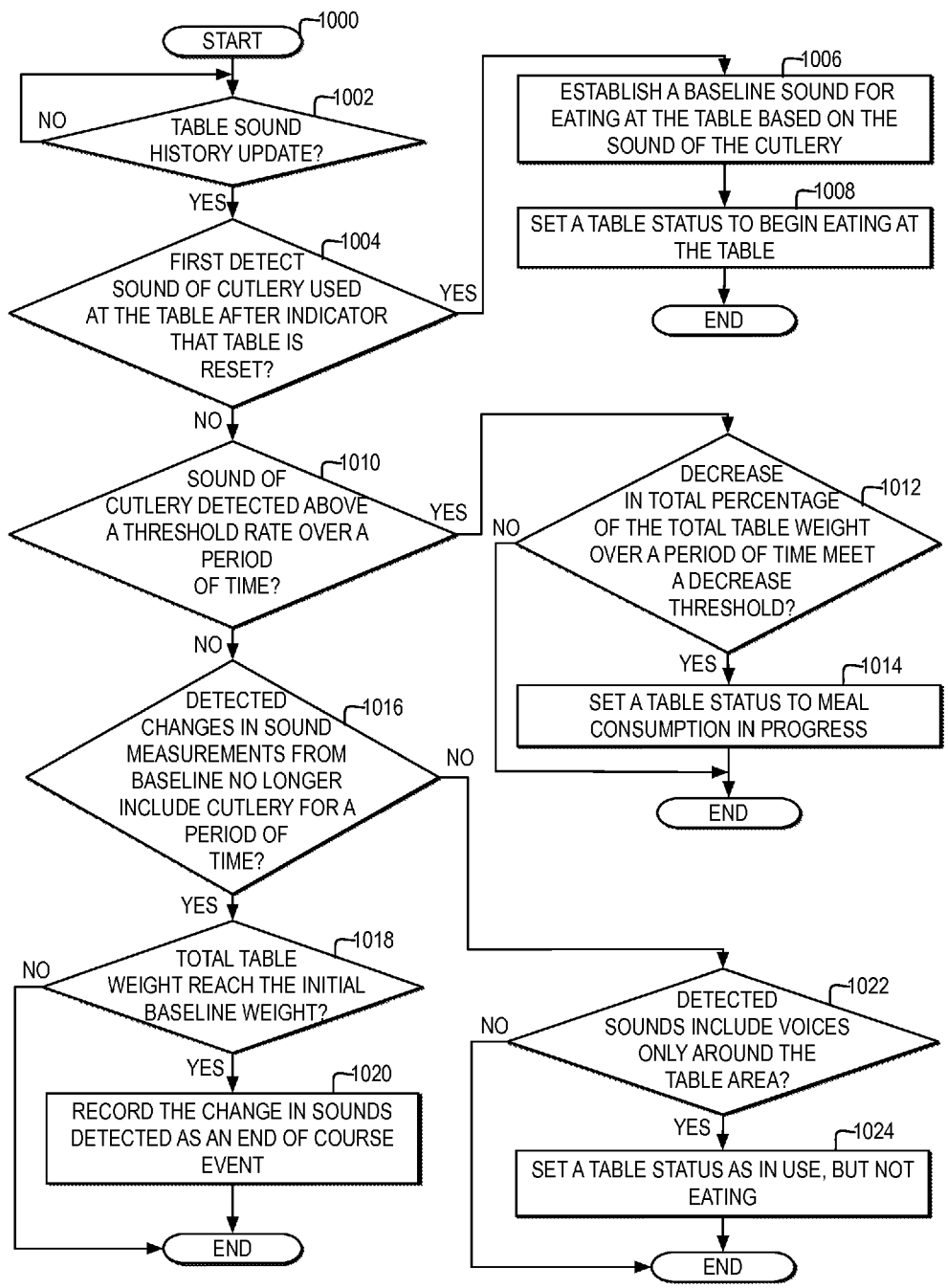
FIG. 10 illustrates a high level logic flowchart of a process and computer program product for a table status based on table sound sensor outputs.

FIG. 10 illustrates a high level logic flowchart of a process and computer program product for monitoring a table status based on table sound sensor outputs.

In one example, the process and program start at block 1000 and thereafter proceed to block 1002. Block 1002 illustrates a determination whether a table sound history is updated by a sensor output. At block 1002, if a table sound history is updated, then the process passes to block 1004. Block 1004 illustrates a determination whether the sound captured from the sound sensor output is a first detected cutlery sound used at the table after an indicator that the table is reset. At block 1004, if the sound captured from the sound sensor output is the first detected cutlery sound used at the table after an indicator that the table is reset, then the process passes to block 1006. Block 1006 illustrates establishing a baseline sound for eating at the table based on the sound of the cutlery. Next, block 1008 illustrates setting a table status to begin eating at the table, and the process ends.

Returning to block 1004, if the sound captured from the sound sensor output is not the first detected cutlery sound used at the table after an indicator that the table is reset, then the process passes to block 1010. Block 1010 illustrates a determination whether the sound of cutlery is detected in the sound history for the table above a threshold rate over a period of time, where the threshold rate may be indicative of active meal consumption. At block 1010, if the sound of cutlery is detected in the sound history for the table above a threshold rate over a period of time, then the process passes to block 1012. Block 1012 illustrates a determination whether there is a decrease in the percentage of the total table weight calculated at block 922 of FIG. 9 over a period of time that meets a decrease threshold, where the decrease threshold may be indicative of active meal consumption. At block 1012, if there is not a decrease in the percentage of the total table weight over a period of time that meets a decrease threshold, then the process ends. At block 1012, if there is a decrease in the percentage of the total table weight over a period of time that meets a decrease threshold, then the process passes to block 1014. Block 1014 illustrates setting a table status to meal consumption in progress, and the process ends.

Returning to block 1010, if the sound of cutlery is not detected in the sound history for the table above a threshold rate over a period of time, then the process passes to block 1016. Block 1016 illustrates a determination whether the detected changes in sound measurements from the baseline sound no longer include cutlery for a period of time. At block 1016, if the detected changes in sound measurements from the baseline sound no longer include cutlery for a period of time, then the process passes to block 1018. Block 1018 illustrates a determination whether the total table weight has reached the initial baseline weight. At block 1018, if the total table weight has not reached the initial baseline weight, then the process ends. At block 1018, if the total table weight has reached the initial baseline weight, then the process passes to block 1020. Block 1020 illustrates recording the change in sounds detected as an end of course event, and the process ends.

Returning to block 1016, if the detected changes in sound measurements from the baseline sound no longer include cutlery for a period of time, then the process passes to block 1022. Block 1022 illustrates a determination whether the sounds include voices only around a table area. At block 1022, if the sounds do not include voices only around a table area, then the process ends. At block 1022, if the sounds include voices only around a table area, then the process passes to block 1024. Block 1024 illustrates setting a table status as in use, but not eating, and the process ends.

Figure 11:
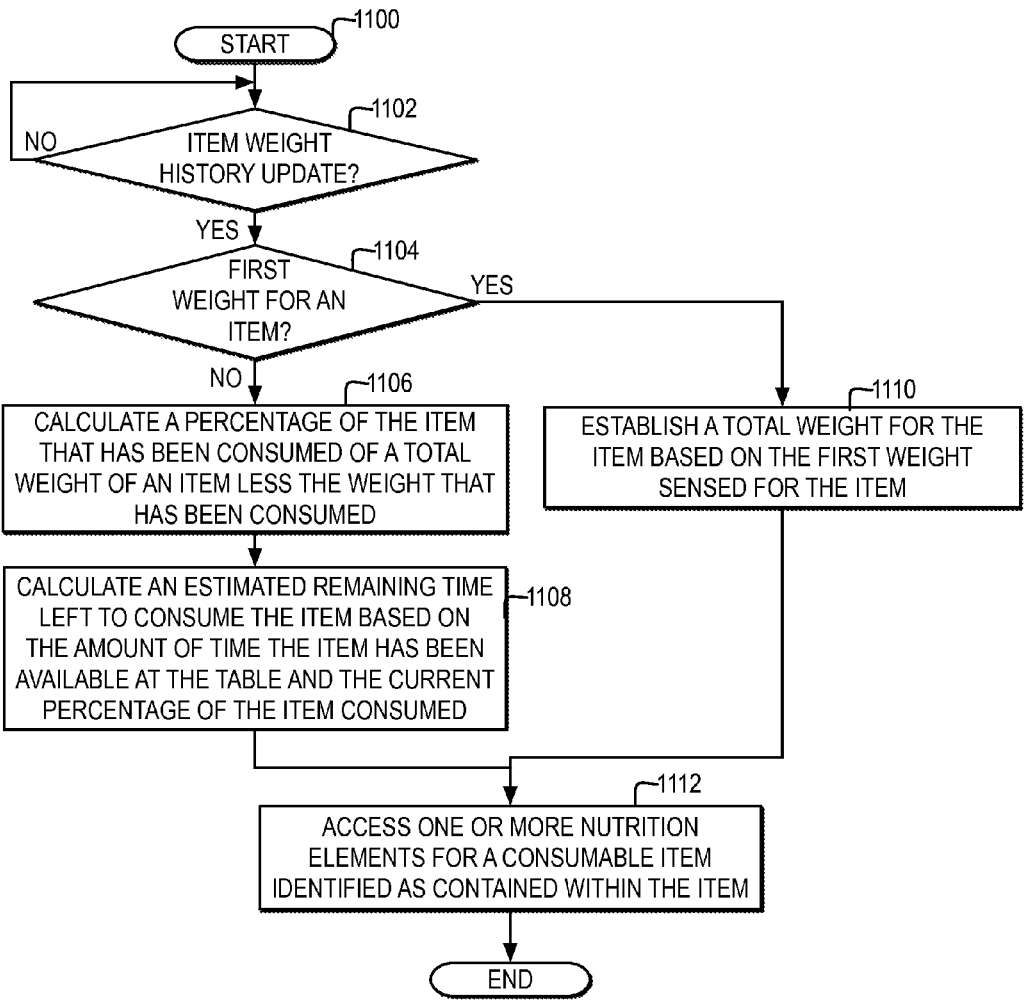
FIG. 11 illustrates a high level logic flowchart of a process and computer program product for monitoring an item status based on item sensor outputs.

FIG. 11 illustrates a high level logic flowchart of a process and computer program product for monitoring an item status based on item sensor outputs.

In one example, the process and program start at block 1100 and thereafter proceed to block 1102. Block 1102 illustrates a determination whether an item weight history is updated by a sensor output. At block 1102, if an item weight history is updated by a sensor output, then the process passes to block 1104. Block 1104 illustrates a determination whether the weight is a first weight for the item. At block 1104, if the weight is a first weight for the item, then the process passes to block 1110. Block 1110 illustrates establishing a total weight for the item based on the first weight sensed for the item. Next, block 1112 illustrates accessing one or more nutrition elements for a consumable item identified as contained within the item, and the process ends.

Returning to block 1104, if the weight is not a first weight for the item, then the process passes to block 1106. Block 1106 illustrates calculating a percentage of the item that has been consumed of a total weight of an item less the weight that has been consumed. Next, block 1108 illustrates calculating an estimated remaining time left to consume the item based on the amount of time the item has been available at the table and the current percentage of the item consumed, and the process passes to block 1112.

Figure 12:
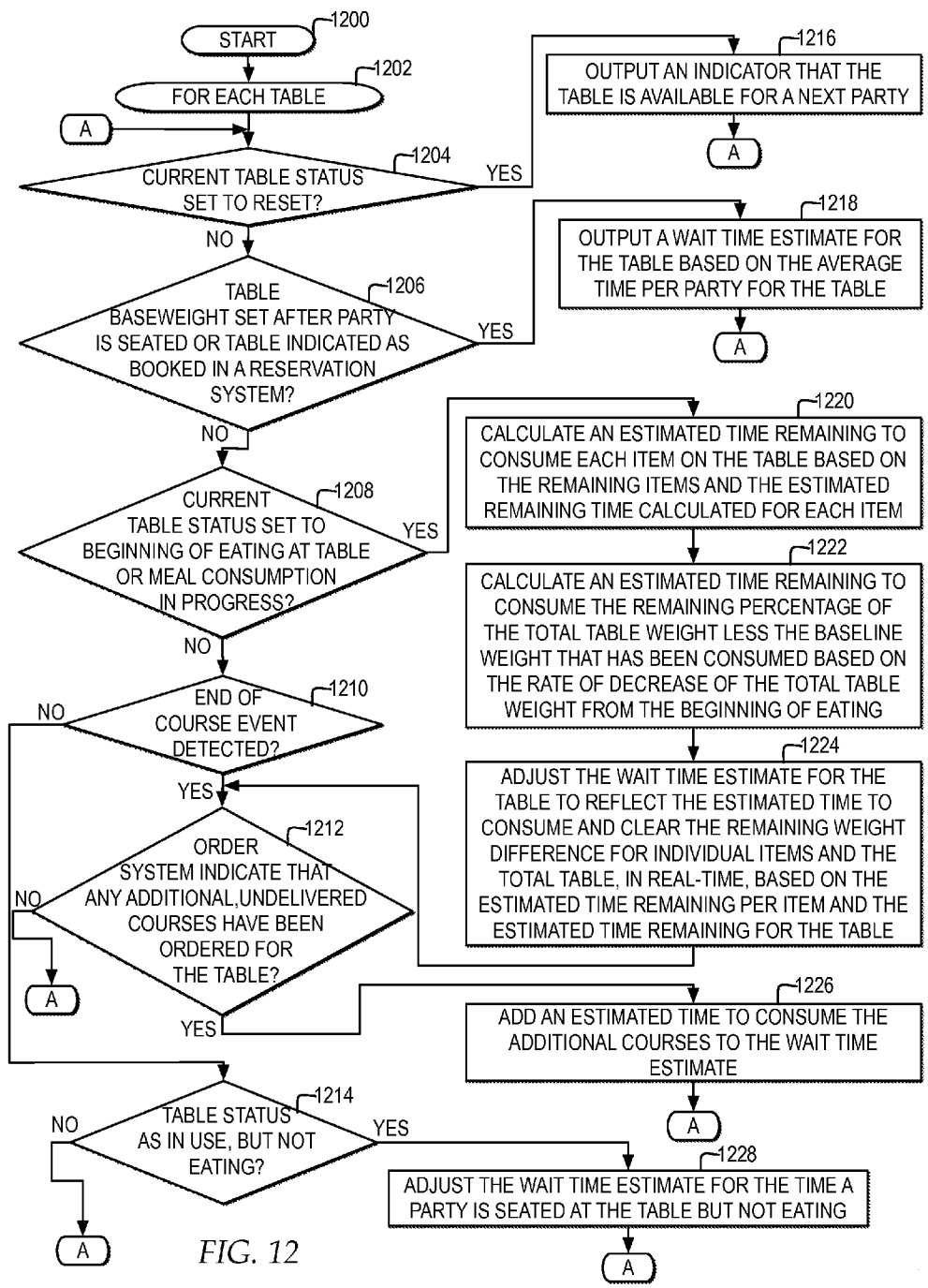
FIG. 12 illustrates a high level logic flowchart of a process and computer program product for calculating wait time estimates for a table based on one or more of sensed table weights, sensed table sounds, and sensed item weights.

FIG. 12 illustrates a high level logic flowchart of a process and computer program product for calculating wait time estimates for a table based on one or more of sensed table weights, sensed table sounds, and sensed item weights.

In one example, the process and program starts at block 1200 and thereafter proceeds to block 1202. Block 1202 illustrates a process performed by table. Next, block 1204 illustrates a determination whether a current table status is set to reset. At block 1204, if a current table status is set to reset, then the process passes to block 1216. Block 1216 illustrates outputting an indicator that the table is available for a next party, and the process returns to block 1204.

Returning to block 1204, if a current table status is not set to reset, then the process passes to block 1206. Block 1206 illustrates a determination whether a table baseweight is set after the party is seated or table is indicated as booked in a reservation system. At block 1206, if a table baseweight is set after the party is seated or table is indicated as booked in a reservation system, then the process passes to block 1218. Block 1218 illustrates outputting a wait time estimate for the table based on the average time per party for the table, and the process returns to block 1204.

Returning to block 1206, if a table baseweight is not set after the party is seated or table is indicated as booked in a reservation system, then the process passes to block 1208. Block 1208 illustrates a determination whether a current table status is set to a beginning of eating at the table or set to meal consumption in progress. At block 1208, if a current table status is set to a beginning of eating at the table or set to meal consumption in progress, then the process passes to block 1220. Block 1220 illustrates calculating an estimated time remaining to consume each item on the table based on the remaining items and the estimated remaining time calculated for each item. Next, block 1222 illustrates calculating an estimated time remaining to consume the remaining percentage of the total table weight less the baseline weight that has been consumed based on the rate of decrease of the total table weight from the beginning of eating. Next, block 1224 illustrates adjusting the wait time estimate for the table to reflect the estimated time to consume and clear the remaining weight difference for individual items and the total table, in real-time, based on the estimated time remaining per item and the estimated time remaining for the table, and the process passes to block 1212.

Returning to block 1208, if a current table status is not set to a beginning of eating at the table or set to meal consumption in progress, then the process passes to block 1210. Block 1210 illustrates a determination whether an end of course event is detected. At block 1210, if an end of course event is detected, then the process passes to block 1212. Block 1212 illustrates a determination whether an order system indicates that any additional courses have been ordered for the table. At block 1212, if an order system indicates that any additional, undelivered courses have been ordered for the table, then the process passes to block 1226. Block 1226 illustrates adding an estimated time to consume the additional courses to the wait time estimate, and the process returns to block 1204. Returning to block 1212, if an order system indicates that no additional, undelivered courses have been ordered for the table, then the process returns to block 1204.

Returning to block 1210, if an end of course event is not detected, then the process passes to block 1214. Block 1214 illustrates a determination whether a table status indicates the table is in use, but not eating. At block 1214, if a table status does not indicate the table is in use, but not eating, then the process returns to block 1204. At block 1214, if a table status indicates the table is in use, but not eating, then the process passes to block 1228. Block 1228 illustrates adjusting the wait time estimate for the time a party a seated at the table but not eating, and the process returns to block 1204.

Figure 13:
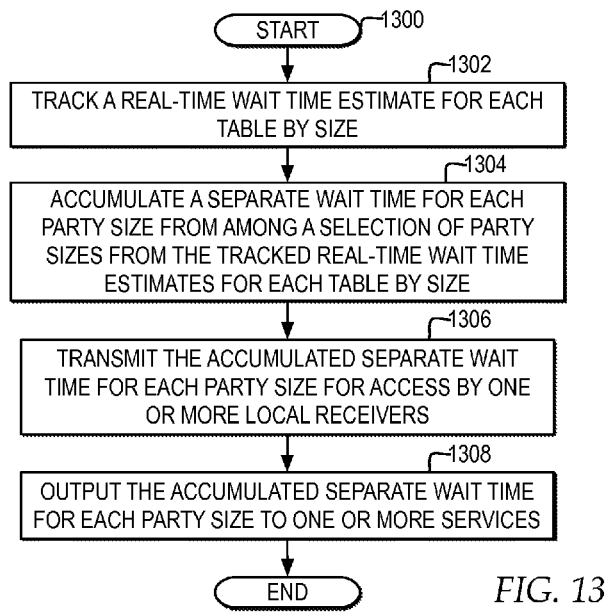
FIG. 13 illustrates a high level logic flowchart of a process and computer program product for determining a wait time estimate by table size.

FIG. 13 illustrates a high level logic flowchart of a process and computer program product for determining a wait time estimate by table size.

In one example, the process and program starts at block 1300 and thereafter proceeds to block 1302. Block 1302 illustrates tracking a real-time wait time estimate for each table by size. Next, block 1304 illustrates accumulating a separate wait time for each party size from among a selection of party sizes from the tracked real-time wait time estimates for each table by size. Thereafter, block 1306 illustrates transmitting the accumulated separate wait time for each party size for access by one or more local receivers. Next, block 1308 illustrates outputting the accumulated separate wait time for each party size to one or more services, and the process ends.

Figure 14:
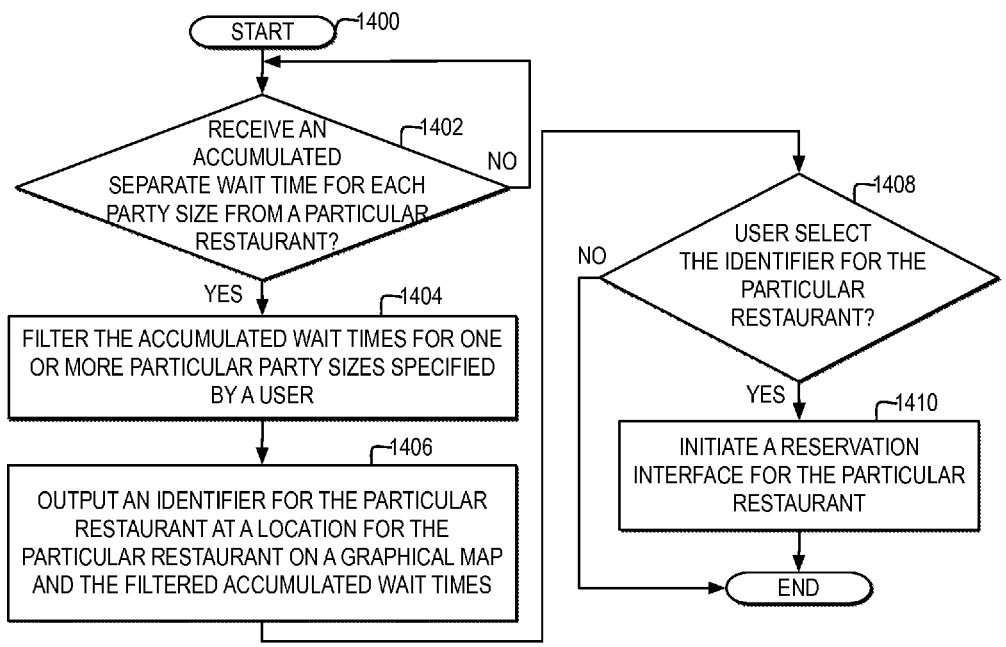
FIG. 14 illustrates a high level logic flowchart of a process and computer program product for managing output of accumulated wait times by party size through a location based service.

FIG. 14 illustrates a high level logic flowchart of a process and computer program product for managing output of accumulated wait times by party size through a location based service.

In one example, the process and program starts at block 1400 and thereafter proceeds to block 1402. Block 1402 illustrates a determination whether a service receives an accumulated separate wait time for each party size from a particular restaurant. In one example, the service may pull the information. In another example, the information may be pushed to the service. At block 1402, if a service receives accumulated separate wait times for each party size from a particular restaurant, then the process passes to block 1404. Block 1404 illustrates filtering the accumulated wait times for one or more particular party sizes specified by a user. Next, block 1406 illustrates outputting an identifier for the particular restaurant at a location for the particular restaurant on a graphical map and the filtered accumulated wait times. Thereafter, block 1406 illustrates a determination whether the user selects an identifier for the particular restaurant. At block 1408, if the user does not select an identifier for the particular restaurant, then the process ends. At block 1408, if the user selects an identifier for the particular restaurant, then the process passes to block 1410. Block 1410 illustrates initiating a reservation interface for the particular restaurant, and the process ends.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method comprising:
   a computer system receiving, one or more inputs over a period of time from one or more outputs of one or more sensors placed within a proximity to a service area, the one or more sensors for detecting at least one of at least one weight and at least one sound;
   the computer system dynamically estimating, based on a rate of a percentage of change of the at least one weight over the period of time and one or more types of sound of the at least one sound for the service area, one or more wait times until a completion of use of the service area; and
   the computer system dynamically generating one or more wait time estimates in real time for a particular user requesting a particular service area size met by a current service area size of the service area based on the one or more wait times and a current number of other users waiting in a queue for the particular service area size.

2. The method according to claim 1, further comprising:
   the computer system dynamically generating the one or more wait time estimates in real time for the particular user requesting the particular service area size met by the current service area size of the service area based on the wait time for the service area, other wait times estimated for other service areas of a plurality of service areas of the particular service area size in a restaurant, and the current number of other users waiting in the queue for the particular service area size.

3. The method according to claim 1, further comprising:
the computer system dynamically estimating the one or more wait times until the completion of use of the service area based on the rate of a percentage of change of the at least one weight specifying a weight of a service area and specifying a separate weight of each of a plurality of items placed on the service area.

4. The method according to claim 1, further comprising:
the computer system receiving the one or more inputs from the one or more outputs of the one or more sensors each placed on a particular item placed on the service area to measure a change in weight of a consumable item within the particular item of the at least one weight during the period of time.

5. The method according to claim 1, further comprising:
the computer system receiving the one or more inputs from the one or more outputs of the one or more sensors placed to detect relative changes in a total weight placed on the service area of the at least one weight during the period of time.

6. The method according to claim 1, further comprising:
the computer system receiving the one or more inputs from the one or more outputs of the one or more sensors placed to detect the one or more types of sounds from among a metallic sound and a non-metallic sound around the service area during the period of time, wherein the metallic sound indicates use of cutlery.

7. The method according to claim 1, further comprising:
the computer system controlling an interface through which a separate identifier for each of the one or more sensors is dynamically registered in association with a particular service area identifier for a particular service area from among a plurality of service areas, each of the one or more sensors removable.

8. A computer system comprising one or more processors, one or more computer-readable memories, one or more computer-readable storage devices, and program instructions, stored on at least one of the one or more storage devices for execution by at least one of the one or more processors via at least one of the one or more memories, the stored program instructions comprising:
program instructions to receive, one or more inputs over a period of time from one or more outputs of one or more sensors placed within a proximity to a service area, the one or more sensors for detecting at least one of at least one weight and at least one sound;
program instructions to dynamically estimate, based on a rate of a percentage of change of the at least one weight over the period of time and one or more types of sound of the at least one sound for the service area, one or more wait times until a completion of use of the service area; and
program instructions to dynamically generate one or more wait time estimates in real time for a particular user requesting a particular service area size met by a current service area size of the service area based on the one or more wait times and a current number of other users waiting in a queue for the particular service area size.

9. The computer system according to claim 8, the stored program instructions further comprising:
program instructions to dynamically generate the one or more wait time estimates in real time for the particular user requesting the particular service area size met by the current service area size of the service area based on the wait time for the service area, other wait times estimated for other service areas of a plurality of service areas of the particular service area size in a restaurant, and the current number of other users waiting in the queue for the particular service area size.

10. The computer system according to claim 8, the stored program instructions further comprising:
program instructions to dynamically estimate the one or more wait times until the completion of use of the service area based on the rate of a percentage of change of the at least one weight specifying a weight of a service area and specifying a separate weight of each of a plurality of items placed on the service area.

11. The computer system according to claim 8, the stored program instructions further comprising:
program instructions to receive the one or more inputs from the one or more outputs of the one or more sensors each placed on a particular item placed on the service area to measure a change in weight of a consumable item within the particular item of the at least one weight during the period of time.

12. The computer system according to claim 8, the stored program instructions further comprising:
program instructions to receive the one or more inputs from the one or more outputs of the one or more sensors placed to detect relative changes in a total weight placed on the service area of the at least one weight during the period of time.

13. The computer system according to claim 8, the stored program instructions further comprising:
program instructions to receive the one or more inputs from the one or more outputs of the one or more sensors placed to detect the one or more types of sounds from among a metallic sound and a non-metallic sound around the service area during the period of time, wherein the metallic sound indicates use of cutlery.

14. The computer system according to claim 8, the stored program instructions further comprising:
program instructions to control an interface through which a separate identifier for each of the one or more sensors is dynamically registered in association with a particular service area identifier for a particular service area from among a plurality of service areas, each of the one or more sensors removable.

15. The computer system according to claim 8, the stored program instructions further comprising:
program instructions to output the one or more wait time estimates for the particular user in an output interface illustrating a map comprising a location of a restaurant comprising the service area, the wait time estimate output in association with the location of the restaurant within the map, the wait time estimate output dynamically updated in real-time for each of the one or more wait time estimates.

16. A computer program product comprising one or more computer-readable storage devices and program instructions, stored on at least one of the one or more storage devices, the stored program instructions comprising:
program instructions to receive, one or more inputs over a period of time from one or more outputs of one or more sensors placed within a proximity to a service area, the one or more sensors for detecting at least one of at least one weight and at least one sound;
program instructions to dynamically estimate, based on a rate of a percentage of change of the at least one weight over the period of time and one or more types of sound of the at least one sound for the service area, one or more wait times until a completion of use of the service area; and program instructions to dynamically generate one or more wait time estimates in real time for a particular user requesting a particular service area size met by a current service area size of the service area based on the one or more wait times and a current number of other users waiting in a queue for the particular service area size.

17. The computer program product according to claim 16, the stored program instructions further comprising:

program instructions to dynamically generate the one or more wait time estimates in real time for the particular user requesting the particular service area size met by the current service area size of the service area based on the wait time for the service area, other wait times estimated for other service areas of a plurality of service areas of the particular service area size in a restaurant, and the current number of other users waiting in the queue for the particular service area size.

18. The computer program product according to claim 16, the stored program instructions further comprising:

program instructions to dynamically estimate the one or more wait times until the completion of use of the service area based on the rate of a percentage of change of the at least one weight specifying a weight of a service area and specifying a separate weight of each of a plurality of items placed on the service area.

19. The computer program product according to claim 16, the stored program instructions further comprising:

program instructions to receive the one or more inputs from the one or more outputs of the one or more sensors each placed on a particular item placed on the service area to measure a change in weight of a consumable item within the particular item of the at least one weight during the period of time.

* * * * *